US008130839B2

(12) United States Patent
Kawashima et al.

(10) Patent No.: US 8,130,839 B2
(45) Date of Patent: Mar. 6, 2012

(54) INFORMATION PROCESSING APPARATUS WITH VIDEO ENCODING PROCESS CONTROL BASED ON DETECTED LOAD

(75) Inventors: Yuji Kawashima, Ome (JP); Yoshihiro Kikuchi, Ome (JP); Tatsuro Fujisawa, Akishima (JP); Shingo Suzuki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1115 days.

(21) Appl. No.: 11/940,767

(22) Filed: Nov. 15, 2007

(65) Prior Publication Data

US 2008/0159397 A1 Jul. 3, 2008

(30) Foreign Application Priority Data

Dec. 27, 2006 (JP) .................................. 2006-353033

(51) Int. Cl.
*H04N 7/12* (2006.01)
(52) U.S. Cl. .............................. 375/240.16; 375/240.12
(58) Field of Classification Search ............. 375/240.01, 375/240.12, 240.16
See application file for complete search history.

(56) References Cited

U.S. PATENT DOCUMENTS

| 7,362,809 B2 * | 4/2008 | Booth et al. | 375/240.16 |
| 7,400,680 B2 * | 7/2008 | Jiang | 375/240.16 |
| 7,953,153 B2 * | 5/2011 | Tsai et al. | 375/240.16 |
| 2001/0053182 A1 | 12/2001 | Ishiyama | |
| 2002/0118756 A1 | 8/2002 | Nakamura et al. | |
| 2003/0185300 A1 | 10/2003 | Hagiwara | |
| 2005/0175100 A1 * | 8/2005 | Yamane et al. | 375/240.16 |

FOREIGN PATENT DOCUMENTS

| JP | 09-023422 | 1/1994 |
| JP | 10-243404 | 9/1998 |
| JP | 2001-346216 | 12/2001 |
| JP | 2006-270751 | 10/2006 |

OTHER PUBLICATIONS

Japanese Office Action dated Nov. 30, 2010.

* cited by examiner

*Primary Examiner* — Hassan Phillips
*Assistant Examiner* — Saba Tsegaye
(74) *Attorney, Agent, or Firm* — Pillsbury Winthrop Shaw Pittman, LLP (57) ABSTRACT

According to one embodiment, an information processing apparatus includes an input unit which inputs moving picture signal, a processing load detecting unit which detects a processing load, a motion estimation unit which detects the interframe motion of blocks obtained by dividing an input picture constituting the input moving picture signal in a square region which is set according to the processing load detected at the processing load detecting unit and whose diagonal line is parallel to one side of the blocks, a motion compensation prediction unit which generates a prediction signal based on the result of the detection at the motion estimation unit, a conversion unit which converts a prediction residual error signal obtained from a residual error in the prediction signal and the input picture signal, and an output unit which encodes a conversion coefficient converted at the conversion unit, and outputs an encoded stream.

2 Claims, 7 Drawing Sheets

INFORMATION PROCESSING APPARATUS WITH VIDEO ENCODING PROCESS CONTROL BASED ON DETECTED LOAD

CROSS-REFERENCE TO RELATED APPLICATIONS

This application is based upon and claims the benefit of priority from Japanese Patent Application No. 2006-353033, filed Dec. 27, 2006, the entire contents of which are incorporated herein by reference.

BACKGROUND

1. Field

One embodiment of the invention relates to moving picture encoding techniques suitable for use in an information processing apparatus, such as a personal computer.

2. Description of the Related Art

In recent years, a personal computer provided with a software encoder for encoding moving pictures by software has begun to be popularized. Moreover, the H. 264/AVC (Advanced Video Coding) standard has recently drawn attention as a next-generation moving picture compression encoding technique. The H. 264/AVC standard relates to higher-efficiency compression encoding techniques than conventional equivalents, such as MPEG 2 or MPEG 4. For this reason, in an encoding process conforming to the H. 264/AVC standard, a larger amount of processing is needed than in conventional compression encoding techniques, such as MPEG2 or MPEG4. With this backdrop, various proposals to decrease the amount of moving picture encoding have been made (e.g., refer to Jpn. Pat. Appln. KOKAI Publication No. 2001-346216).

Since a motion estimation process can select a plurality of reference frames even in the encoding process complying with the H. 264/AVC standard, the number of times block matching is done to detect the optimum motion vector increases in proportion to the number of frames as compared with the conventional compression encoding techniques. Accordingly, in a software encoder that operates on a personal computer (where other software may run in parallel), a mechanism that adaptively skips a motion estimation process according to, for example, the load on the processor or the like has been desired strongly.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus for encoding a moving picture signal, includes a processing load detecting unit configured to detect a processing load, an input unit configured to input moving picture signal, a motion estimation unit configured to detect the inter-frame motion of blocks obtained by dividing an input picture constituting the input moving picture signal in a square region which is set according to the processing load detected at the processing load detecting unit and whose diagonal line is parallel to one side of the blocks, a motion compensation prediction unit configured to generate a prediction signal based on the result of the detection at the motion estimation unit, a conversion unit configured to convert a prediction residual error signal obtained from a residual error in the prediction signal and the input picture signal, and an output unit configured to encode a conversion coefficient converted at the conversion unit, and to output an encoded stream.

Figure 1:
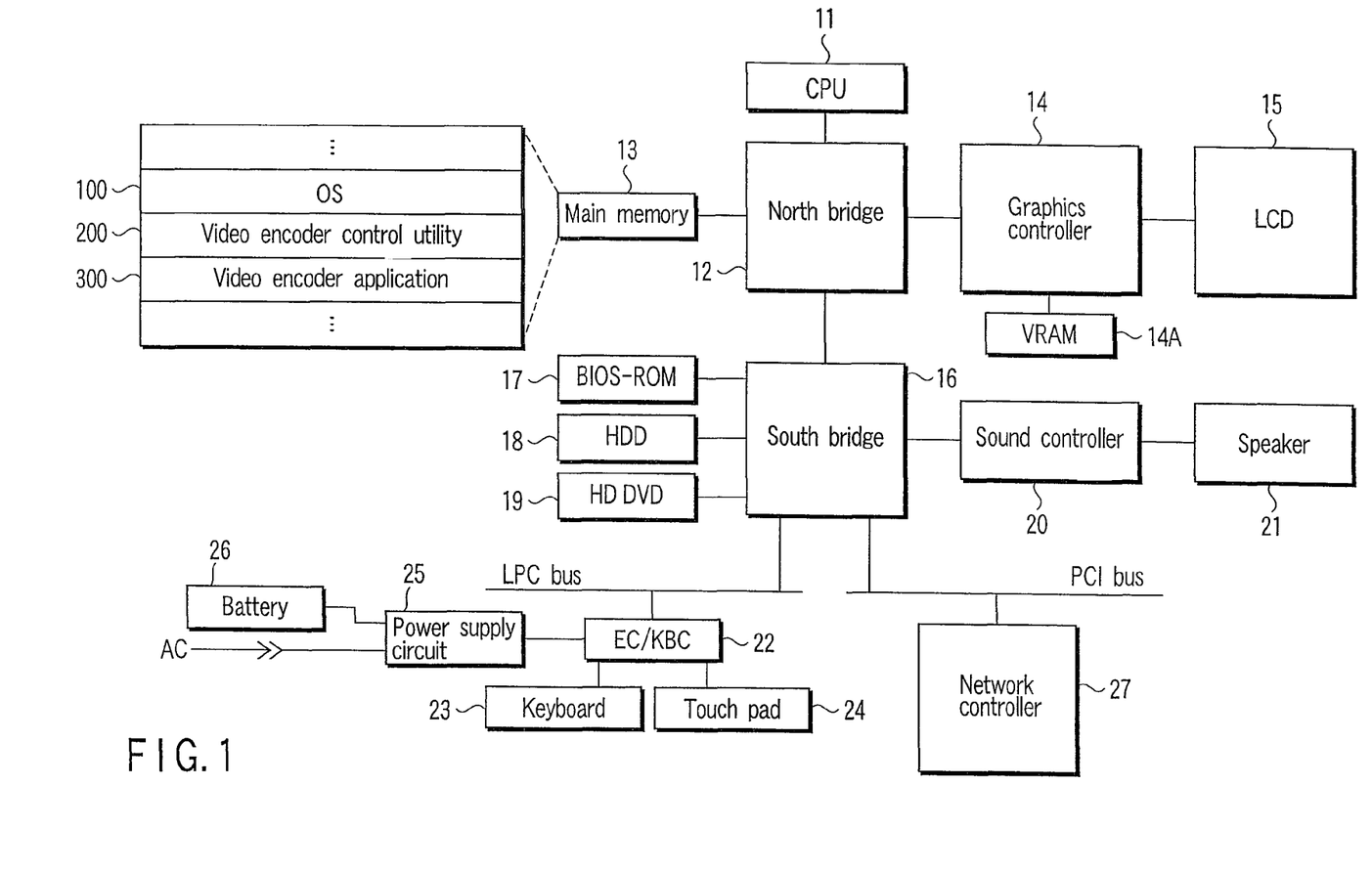
FIG. 1 is an exemplary diagram showing the configuration of an information processing apparatus (or personal computer) according to an embodiment of the invention.

FIG. 1 is an exemplary diagram showing the configuration of an information processing apparatus according to the embodiment. The information processing apparatus is realized in the form of, for example, a notebook personal computer that can be powered by a battery.

As shown in FIG. 1, the computer includes a CPU 11, a north bridge 12, a main memory 13, a graphics controller 14, a VRAM 14A, an LCD 15, a south bridge 16, a BIOS-ROM 17, an HDD 18, an HD DVD 19, a sound controller 20, a speaker 21, an embedded controller/keyboard controller IC (EC/KBC) 22, a keyboard 23, a touch pad 24, a power supply circuit 25, a battery 26, and a network controller 27.

The CPU 11 is a processor which controls the operation of each section of the computer. The CPU 11 executes an operating system (OS) 100 and various application programs including utilities which operate under the control of the OS 100, loaded from the HDD 18 into the main memory 13. The various application programs include a video encoder control utility 200 and a video encoder application 300.

The video encoder application 300 is software for encoding moving pictures. The video encoder application 300 is a software encoder complying with the H. 264/AVC standard. The video encoder control utility 200 detects not only the video processing load at the video encoder application 300 but also the load of all the process of encoding moving pictures, taking into account the load of processing audio, rendering, and the like excluding the video processing load. On the basis of the result of the detection, the video encoder control utility 200 controls the contents of the encoding process executed by the video encoder application 300. More specifically, the video encoder control utility 200 simplifies the motion estimation process progressively.

Figure 2:
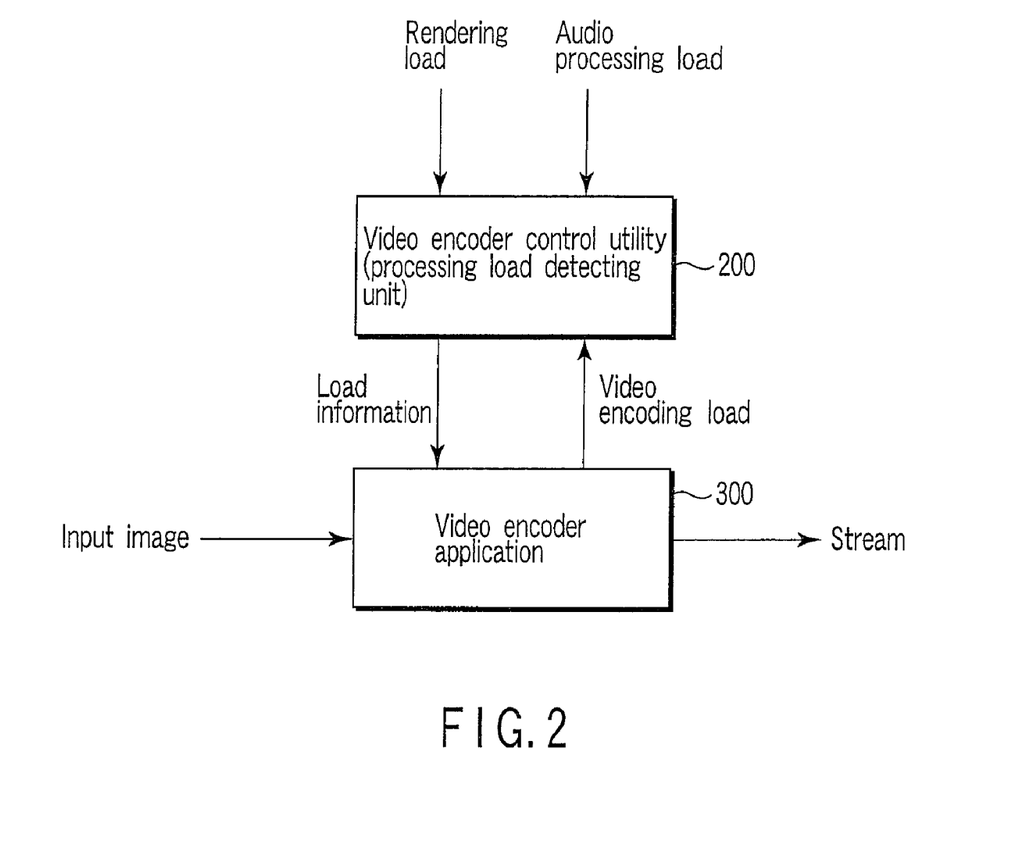
FIG. 2 is an exemplary diagram showing the relationship between a video encoder control utility and a video encoder application which operate on the computer of the embodiment.

FIG. 2 is an exemplary diagram showing the relationship between the video encoder control utility 200 and the video encoder application 300.

As shown in FIG. 2, the video encoder control utility 200 acquires information on the video encoding load from the video encoder application 300, and also acquires the audio processing load, rendering load, and the like excluding the video encoding load, thereby detecting the load of all the process of encoding moving pictures. That is, the video encoder control utility 200 functions as a processing load detecting unit related to encoding moving pictures.

The video encoder control utility 200 creates load information according to the load of all the process of encoding detected moving pictures and supplies the load information to the video encoder application 300. Then, on the basis of the load information from the video encoder control utility 200, the video encoder application 300 simplifies the motion estimation process progressively.

The CPU 11 also executes a BIOS stored in the BIOS-ROM 17. The BIOS is a program for hardware control.

The north bridge 12 is a bridge device which connects the local bus of the CPU 11 and the south bridge 16. The north bridge 12 has the function of communicating with the graphic controller 14 via the bus. The north bridge 12 includes a memory controller which provides access control of the main memory 13.

The graphics controller 14 is a display controller which controls the LCD 15 used as a display monitor of the computer. The graphics controller 14 generates a display signal to be sent to the LCD 15 from the picture data written into the VRAM 14A.

The south bridge 16 is a controller which controls various devices on a PCI bus and an LPC bus. To the south bridge 16, the BIOS-ROM 17, HDD 18, HD DVD 19, and sound controller 20 are directly connected. The south bridge 16 has the function of controlling these units. The sound controller 20 is a sound source controller which controls the speaker 21.

The EC/KBC 22 is a one-chip microcomputer into which an embedded controller for power management and a keyboard controller for controlling the keyboard 23 and touch pad 24 are integrated. In cooperation with the power supply circuit 25, the EC/KBC 22 controls the supply of power from the battery 26 or an external AC power supply to various sections. The network controller 27 is a communication device which communicates with an external network, such as the Internet.

Figure 3:
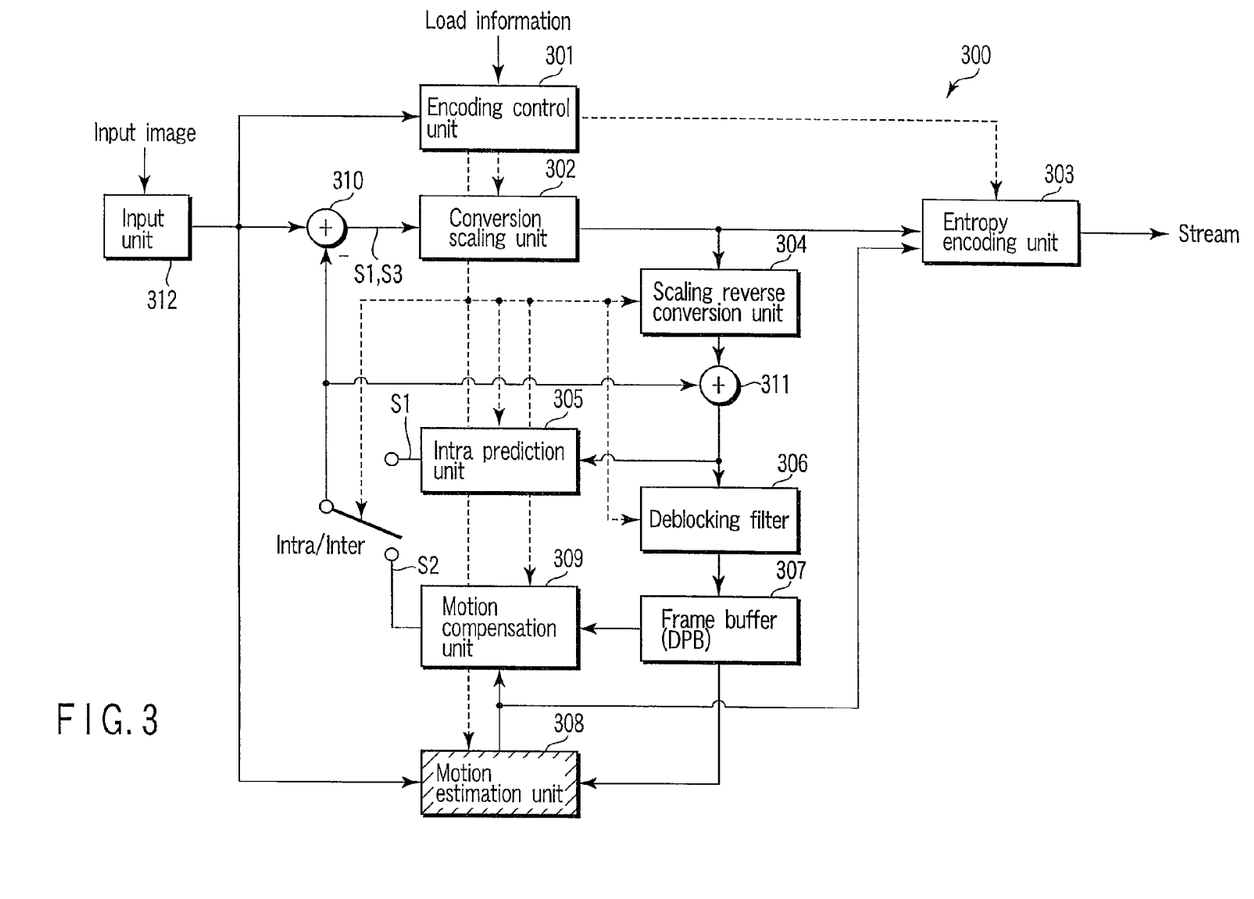
FIG. 3 is an diagram showing a functional configuration of a software encoder realized by a video encoder application operating on the computer of the embodiment.

Next, referring to FIG. 3, the functional configuration of a software encoder realized by the video encoder application 300 operating on the computer having the above hardware configuration will be explained. In FIG. 3, the solid lines indicate the flow of data and the dotted lines indicate the flow of control signals.

The encoding process at the video encoder application 300 conforms to the H. 264/AVC standard. As shown in FIG. 3, the video encoder application 300 includes an encoding control unit 301, a conversion scaling unit 302, an entropy encoding unit 303, a scaling reverse conversion unit 304, an intra prediction unit 305, a deblocking filter 306, a frame buffer 307, a motion estimation unit 308, a motion compensation unit 309, adders 310, 311, and an input unit 312.

The video encoder application 300 causes the encoding control unit 301 to supervise overall control and encodes each screen (or picture) input from the input unit 312 in macro block units of, for example, 16×16 pixels. Then, either the intra-frame prediction coding mode (or intra coding mode) or the motion compensation inter-frame prediction coding mode (inter coding mode) is selected on a macro block basis.

In the intra coding mode, the intra prediction unit 305 generates a prediction signal s1 from a screen to be encoded (or a picture to be encoded). The conversion scaling unit 302 transforms the prediction signal orthogonally and quantizes the resulting signal. The entropy encoding unit 303 performs entropy coding of the signal, thereby encoding the signal.

On the other hand, in the inter-frame prediction coding mode, the motion estimation unit 308 estimates the motion from the already encoded screen (or picture) stored in the frame buffer 307. Then, the motion compensation unit 309 generates, on a predetermined shape basis, a motion compensation inter-frame prediction signal s2 corresponding to the screen to be encoded (or the picture to be encoded). Then, the conversion scaling unit 302 performs orthogonal transformation and quantization of a prediction error signal s3 obtained by subtracting the motion compensation inter-frame prediction signal s2 from the screen to be encoded (or the picture to be encoded). The entropy encoding unit 303 performs entropy coding of the signal, thereby encoding the signal.

Furthermore, the scaling reverse conversion unit 304 performs inverse quantization and inverse orthogonal transformation of the quantized coefficient of the orthogonally transformed and quantized image (or picture). The deblocking filter 306 carries out a deblocking filter process to reduce block noise.

The load information supplied from the video encoder control utility 200 to the video encoder application 300 having such a functional configuration is received by the encoding control unit 301. In the encoding process complying with the H. 264/AVC standard, since the motion estimation process can select a plurality of reference frames, the number of times block matching is done to detect the optimum motion vector increases in proportion to the number of frames as compared with a case where the conventional encoding technique is used. Therefore, in the video encoder application 300, the motion estimation unit 308 is provided with a mechanism for progressively simplifying the motion estimation process according to the load information detected by the video encoder control utility 200 on the basis of the control signal from the encoding control unit 301. Hereinafter, the mechanism will be explained in detail.

Here, the Rate-Distortion Optimum (RDO) scheme of selecting the optimum combination of a coding distortion and a coding amount is used as an encoding mode selecting method conforming to the H. 264/AVC standard. Moreover, it is assumed that a rectangular region search, such as a full pel search or a hierarchical search, is used as a motion estimation algorithm.

In the RDO in the motion estimation process (hereinafter, also referred to as the ME), a motion vector m whose output cost J is the smallest is selected as the optimum one using a cost function shown in equation (3):

$$J = SAD(m) + \lambda_M \times R(m) \quad (3)$$

Figure 4:
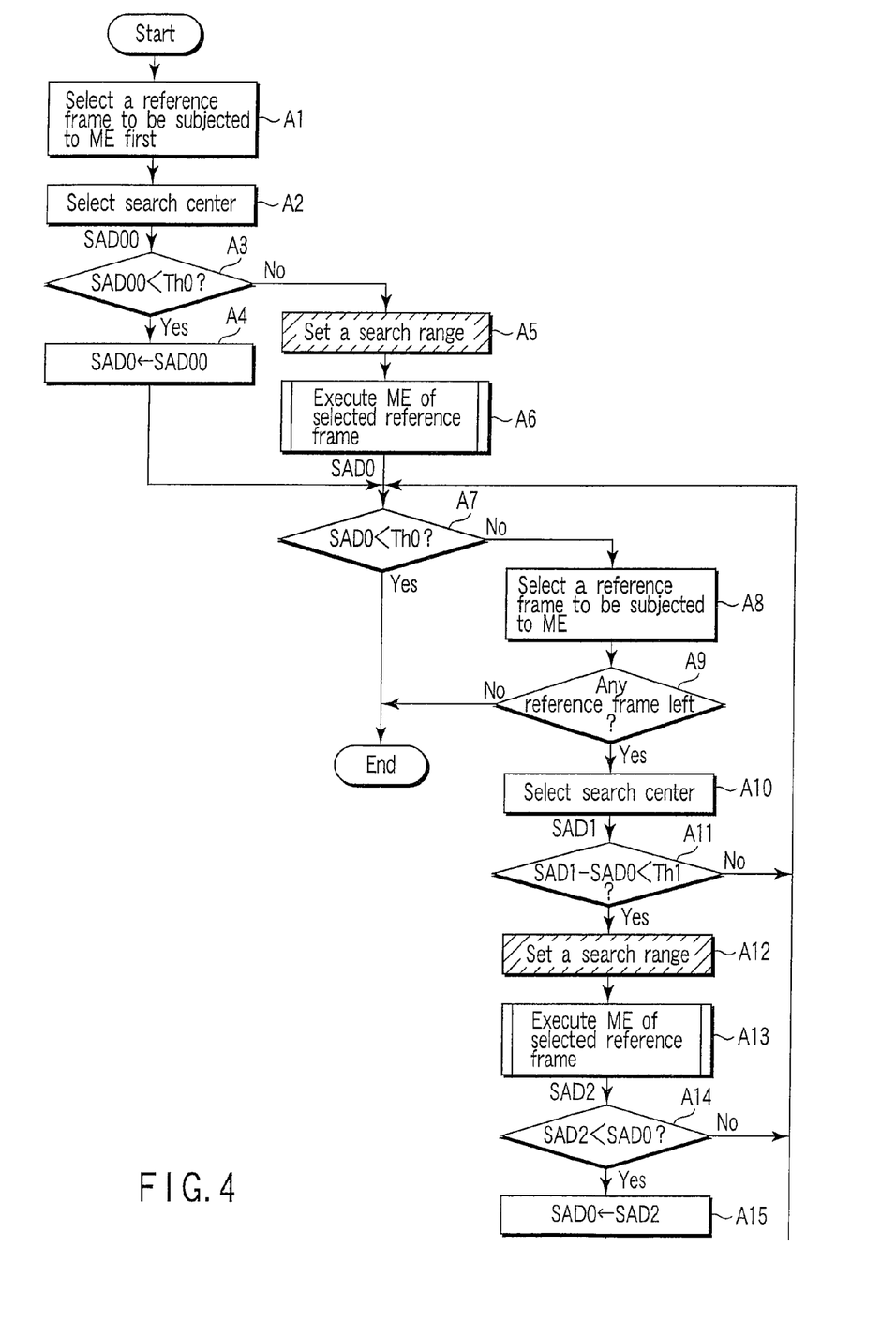
FIG. 4 is an exemplary flowchart showing the operating procedure of a motion estimation process executed by the motion estimation unit of the video encoder application operating on the computer of the embodiment.

SAD(m): the sum of the absolute values of prediction error signals $\lambda_M$: Lagrange multiplier R(m): the sum of the coding amount of difference vectors and the coding amount of reference indexes On the basis of the SAD, coding amount, and cost of the motion vector obtained from the result of the reference frame subjected to the ME process, the ME of the remaining reference frames is executed and the parameters (including the search center and search range) of the remaining frames are determined for a certain partition. FIG. 4 is an exemplary flowchart showing the operating procedure of the motion estimation process executed by the motion estimation unit 308 of the video encoder application 300.

First, the motion estimation unit 308 selects a reference frame to be subjected to the ME first from the encoded frames stored in the frame buffer 307 (block A1). The motion estimation unit 308 may select such a reference frame from those temporally close to the reference frame or from the states of the frames referred to in an adjacent block.

Next, the search center is selected (block A2). The SAD is calculated at individual positions of vectors (only when SAD0 is not too large) which a zero point vector, a prediction vector, and a vector used in a so-called telescopic search where MV0 are prorated with respect to the time axis. Of the resulting values, the smallest SAD is determined to be the search center.

When the SAD, coding amount, and cost at the search center are SAD0, R0, and J0 respectively, if SAD0 is sufficiently small (YES in block A3), the ME for the present partition is ended at the time (YES in steps A4 and A7). If not (NO in block A3), a search range taking into account the cost obtained using equation (3) is set (block A5). Then, the search range setting mechanism is a mechanism provided to simplify the motion estimation process progressively.

More specifically, if the SAD in the search range search center position and the coding amount of difference vectors and reference indexes are SAD1 and R1 respectively. The SAD of the vector obtained by the ME to be executed, the coding amount of difference vectors and reference indexes, and cost are SAD2, R2, and J2 respectively, searching for a vector where cost J2 is smaller than J0 is sufficient:

$$SAD2 = SAD1 - \Delta E_{SAD} \quad (4)$$

$\Delta E_{SAD}$: Expected value of SAD decreasing in search

Figure 5:
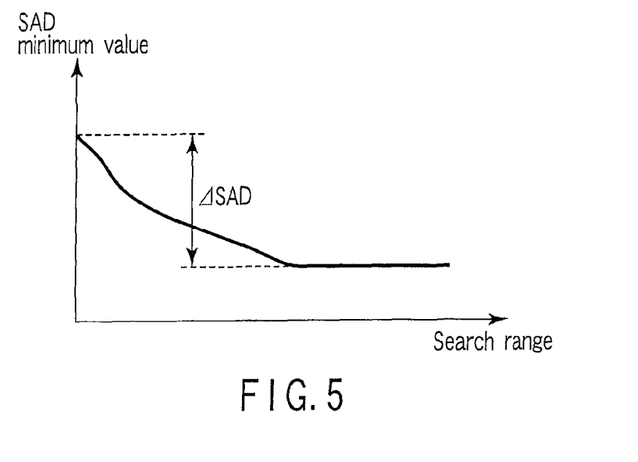
FIG. 5 is an exemplary diagram showing the relationship between a search range and the minimum value of SAD (the sum of absolute differences between the original picture and a reference picture)

The expected value ($\Delta E_{SAD}$) decreasing in search may be an empirical value or be obtained from the result of executing the ME before. For example, as shown in FIG. 5, the expected value may be the average value of the difference $\Delta SAD$ between the SAD at the search center in detecting the motion of a macro block adjacent to the macro block to be encoded and the final SAD.

If the search range condition J2<J0 and equation (3) and equation (4) are used, it follows from equation (3)

J0(the cost of the executed ME result)=$SAD0 + \lambda_M \times R0$

J1 (the cost at the search center)=$SAD1 + \lambda_M \times R1$
J2=$SAD2 + \lambda_M \times R2$
that what fulfils the expression J2<J0 is $SAD2 + \lambda_M \times R2 < SAD0 + \lambda_M \times R0 \Rightarrow R2 < R0 - (SAD2 - SAD0)/\lambda_M$.

Substituting equation (4) into SAD2 gives $R2 < R0 - (SAD1 - \Delta E_{SAD} - SAD0)/\lambda_M$.

Therefore, the motion estimation unit 308 of the video encoder application 300 sets all the vectors m satisfying the following expression (5) as a region (a square region) to be searched:

$$R2(m) < R0 - (SAD1 - \alpha \Delta E_{SAD} - SAD0)/\lambda_M \quad (5)$$

Figure 6:
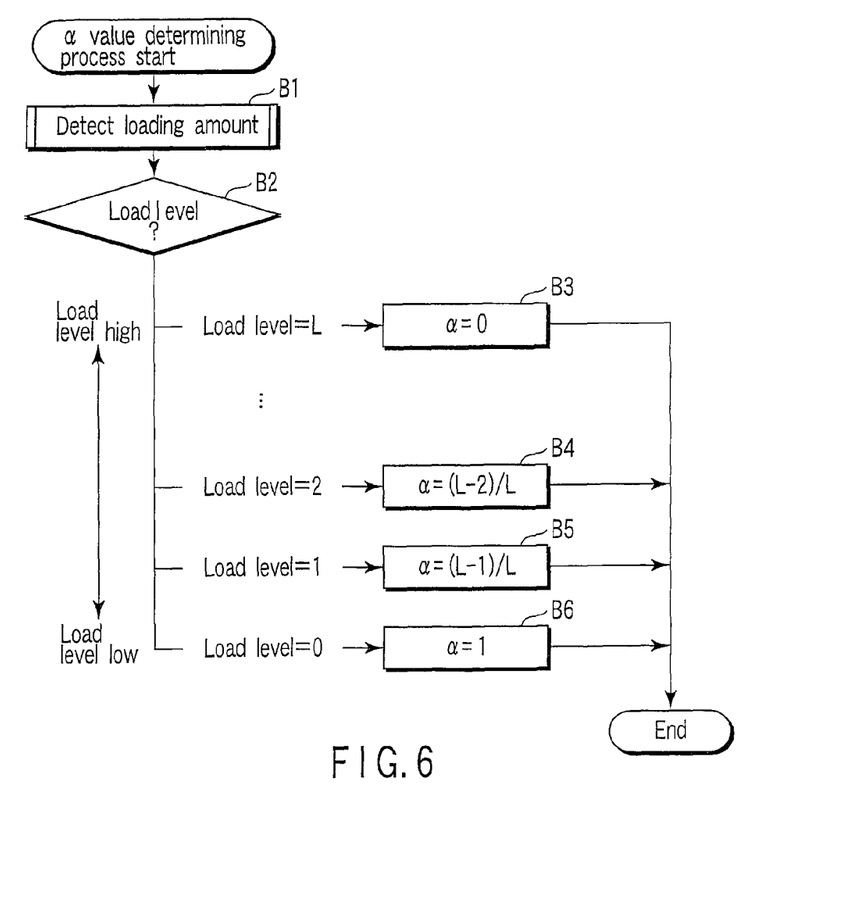
FIG. 6 is an exemplary flowchart showing the procedure of an α value determining process executed by the video encoder control utility and video encoder application which operate on the computer of the embodiment.

As shown in expression (5), the search range is varied according to the load level by providing a in the term $\Delta E_{SAD}$. Here, α is a constant included in the range equal to or larger than 0 and equal to or smaller than 1 and, as shown in FIG. 6, has a larger value as the load level gets higher.

Specifically, first, the video encoder control utility 200 detects the load of all the process of encoding moving pictures (block B1). The encoding control unit 301 of the video encoder application 300 determines the load level from the load information from the video encoder control utility 200 (block B2) Then, receiving the result of the determination in the form of a control signal, the motion estimation unit 308 of the video encoder application 300 sets a value according to the load level as α (steps B3 to B6) FIGS. 7 to 11 show conceptual diagrams of a search range set by the motion estimation unit 308 of the video encoder application 300.

Figure 7:
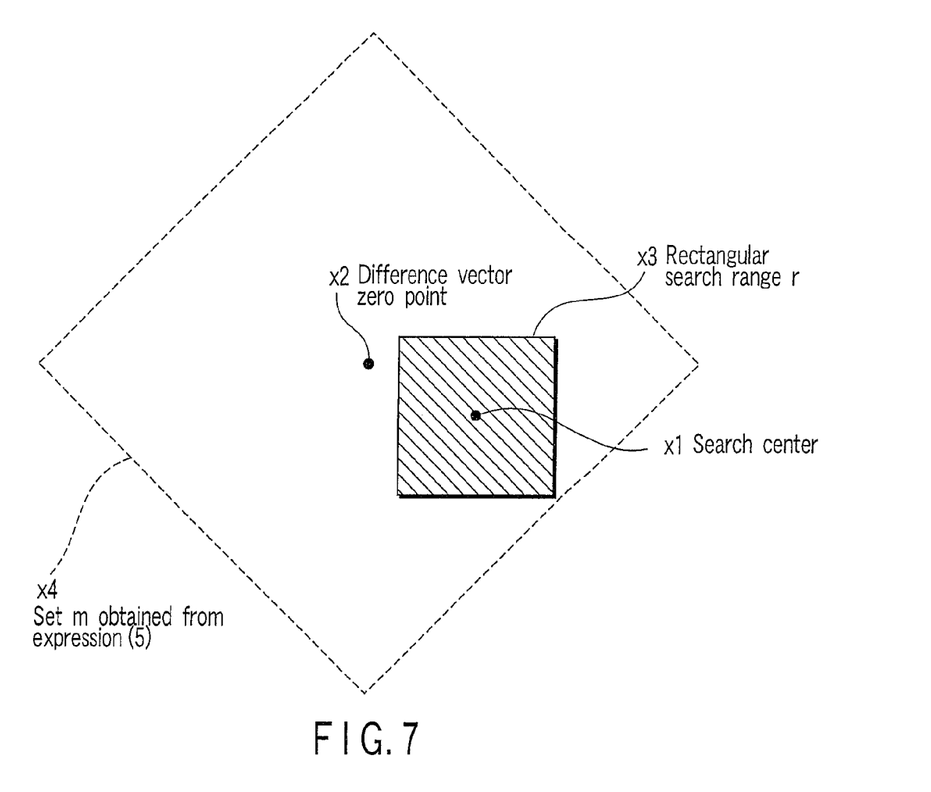
FIG. 7 is an exemplary first diagram showing a conceptual diagram of a search range set by the motion estimation unit of the video encoder application 300 operating on the computer of the embodiment (in a case where the center of the rectangular search range and the center of the calculated set do not coincide with each other and all of the rectangular search range is included in the calculated set)
Figure 8:
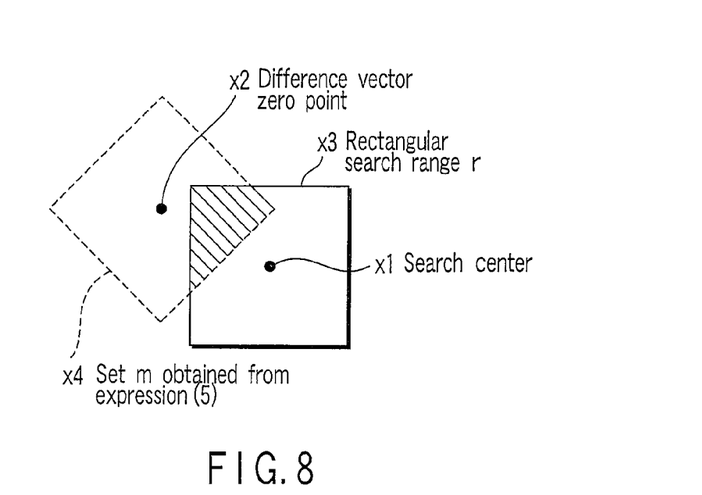
FIG. 8 is an exemplary second diagram showing a conceptual diagram of a search range set by the motion estimation unit of the video encoder application 300 operating on the computer of the embodiment (in a case where the center of the rectangular search range and the center of the calculated set do not coincide with each other and a part of the rectangular search range is included in the calculated set)

FIGS. 7 and 8 show examples of search ranges when the center (x1) of a rectangular search range and a point (x2) (the center of the set obtained from expression (5)) where a difference vector becomes zero do not coincide with each other. A rectangular search range r (x3) (rectangular region), which includes values set in encoder parameters or the like, is given in advance by the operator of the video encoder application 300. The rectangular search range r (x3) is set as a rectangle having sides parallel to the sides of a target block.

FIG. 7 shows a case where all of the rectangular search range r (x3) is included in a set m (x4) (a square region) obtained from expression (5). FIG. 8 shows a case where a part of the rectangular search range r is included in the set m (x4) obtained from expression (5). As shown in the figures, the overlapping part (or shaded part) of the rectangular search range r (x3) having sides parallel to the sides of the target block and the square set m (x4) obtained from expression (5) whose diagonal line is parallel to one side of the target block is set as a search range.

Figure 9:
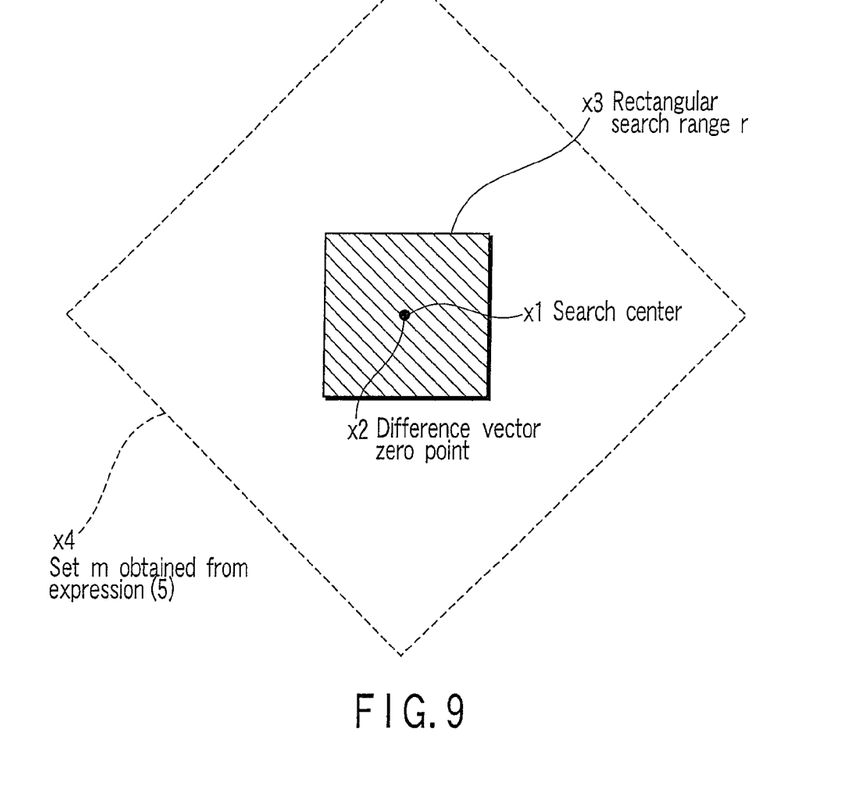
FIG. 9 is an exemplary third diagram showing a conceptual diagram of a search range set by the motion estimation unit of the video encoder application 300 operating on the computer of the embodiment (in a case where the center of the rectangular search range and the center of the calculated set coincide with each other and all of the rectangular search range is included in the calculated set)
Figure 10:
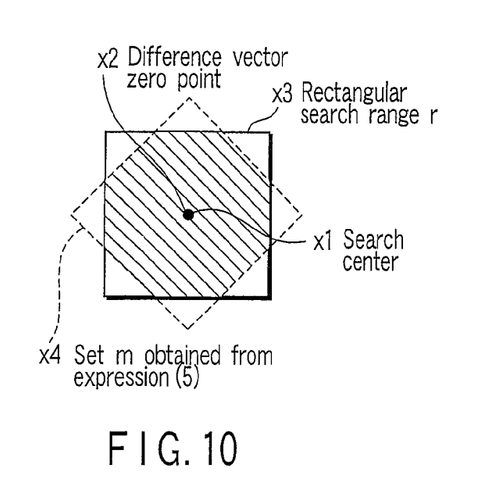
FIG. 10 is an exemplary fourth diagram showing a conceptual diagram of a search range set by the motion estimation unit of the video encoder application 300 operating on the computer of the embodiment (in a first example of a case where the center of the rectangular search range and the center of the calculated set coincide with each other and a part of the rectangular search range is included in the calculated set)
Figure 11:
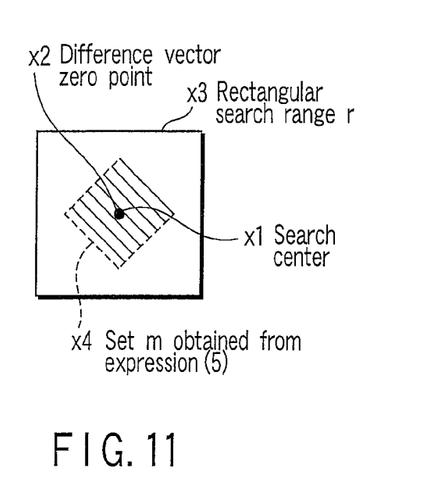
FIG. 11 is an exemplary fifth diagram showing a conceptual diagram of a search range set by the motion estimation unit of the video encoder application 300 operating on the computer of the embodiment (in a second example of the case where the center of the rectangular searching range and the center of the calculated set coincide with each other and a part of the rectangular search range is included in the calculated set).

FIGS. 9 to 11 show examples of search ranges when the center (x1) of the rectangular search range and the point (x2)

(the center of the set obtained from expression (5)) where a difference vector becomes zero coincide with each other. FIG. 9 shows a case where all of the rectangular search range r (x3) is included in the set m (x4) obtained from expression (5).

FIGS. 10 and 11 show a case where a part of the rectangular search range r is included in the set m (x4) obtained from expression (5). As shown in the figures, the overlapping part (or shaded part) of the rectangular search range r (x3) having sides parallel to the sides of the target block and the square set m (x4) obtained from expression (5) whose diagonal line is parallel to one side of the target block is set as a search range as described above.

After the search range is set, the motion estimation process (ME) of the selected reference frame is executed (block A6). When the SAD, coding amount, and cost of the vector obtained at that time are SAD0, R0, and J0, if SAD0 is sufficiently small (YES in block A7), the ME of the present partition is terminated at the time.

If not (NO in block A7), a reference frame to be subjected to the ME next is selected (block A8). If the SAD, coding amount, and cost of the obtained vector are SAD0, R0, and J0, the processes in steps A10 to A15 corresponding to steps A2 to A6 described above are repeated until a vector whose SAD0 is sufficiently small has been selected. When there is no reference frame to be subjected to the next ME (NO in block A9), the ME of the present partition is terminated at the time. Moreover, in block A10, a vector whose value is smaller than SAD0 of the optimum vector until then is selected as the search center.

As described above, with this computer, it is possible to progressively simplify the motion estimation process in encoding moving pictures.

In the embodiment, it has been assumed that a rectangular region search, such as a full pel search or a hierarchical search, is used as a motion estimation algorithm. If a simplified search, such as a diamond search or a hexagon search, is used as the motion estimation algorithm, similar control can be performed by setting the upper limit of a search moving distance, not the search range. That is, a search moving distance taking into account the cost obtained from equation (3) is set.

In this case, in the vectors m satisfying expression (5), the largest distance from the search center is set as the search moving distance. As described above, the value of α is set according to the load level, thereby making the search moving distance variable.

Furthermore, while the video encoder control utility 200 has functioned as a processing load detecting unit in encoding moving pictures, it is easy to modify the configuration to detect, for example, the load on the CPU 11 or the remaining power of the battery 26. That is, changing the criterion in progressively simplifying the motion estimation process in encoding moving pictures to the load on the CPU 11 or the remaining power of the battery 26 is within the scope of the embodiment.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processing load detecting unit configured to detect a processing load;
an input unit configured to input moving picture signal;
a motion estimation unit configured to detect the interframe motion of blocks obtained by dividing an input picture constituting the input moving picture signal in a square region which is set according to the processing load detected at the processing load detecting unit and whose diagonal line is parallel to one side of the blocks;
a motion compensation prediction unit configured to generate a prediction signal based on the result of the detection at the motion estimation unit;
a conversion unit configured to convert a prediction residual error signal obtained from a residual error in the prediction signal and the input picture signal; and
an output unit configured to encode a conversion coefficient converted at the conversion unit, and to output an encoded stream,
wherein the motion estimation unit detects motion by searching in a rectangular region, sets a search range composed of an overlapping part of a rectangular region whose one side is parallel to one side of the blocks and the square region, and changes the search range for motion detection by changing the square region according to the processing load detected at the processing load detecting unit, and
wherein, if sum of absolute differences between an original picture and a reference picture is SAD, a Lagrange multiplier is $\lambda_M$, sum of the coding amount of a difference vector and the coding amount of a reference index is R, expected value of SAD decreased in searching is $\Delta E_{SAD}$, and the SAD and R0 of a motion vector optimum at the time are SAD0 and R, the SAD in a search center position is SAD1, and the R of a motion vector to be detected is R2, the motion estimation unit sets all motion vectors m satisfying $$R2(m) < R0 - (SAD1 - \alpha \times \Delta E_{SAD} - SAD0)/\lambda_M \qquad (1)$$

as the square region, and sets a motion estimation region by setting constant α in expression (1) to any value in the range of 0 or more and 1 or less according to the processing load detected at the processing load detecting unit.

2. An information processing apparatus comprising:
a processing load detecting unit configured to detect a processing load;
an input unit configured to input moving picture signal;
a motion estimation unit configured to detect the interframe motion of blocks obtained by dividing an input picture constituting the input moving picture signal in a square region which is set according to the processing load detected at the processing load detecting unit and whose diagonal line is parallel to one side of the blocks;
a motion compensation prediction unit configured to generate a prediction signal based on the result of the detection at the motion estimation unit;
a conversion unit configured to convert a prediction residual error signal obtained from a residual error in the prediction signal and the input picture signal; and
an output unit configured to encode a conversion coefficient converted at the conversion unit, and to output an encoded stream, wherein the motion estimation unit detects motion by a simplified search and sets upper limit of a search moving distance according to the processing load detected by the processing load detecting unit, and wherein, if sum of absolute differences between an original picture and a reference picture is SAD, a Lagrange multiplier is $\lambda_M$, sum of the coding amount of a difference vector and the coding amount of a reference index is R, expected value of SAD decreased in searching is $\Delta E_{SAD}$, and the SAD and R of a motion vector optimum at the time are SAD0 and R0, the SAD in a search center position is SAD1, and the R of a motion vector to be detected is R2, the motion estimation unit sets the motion vector m which satisfies $$R2(m) < R0 - (SAD1 - \alpha \times \Delta E_{SAD} - SAD0)/\lambda_M \qquad (2)$$

and whose distance from search center is the largest as a search moving distance, and sets the upper limit of the search moving distance by setting constant $\alpha$ in expression (2) to any value in the range of 0 or more and 1 or less according to the processing load detected at the processing load detecting unit.

\* \* \* \* \*